A. O. ESPE.
TRACTOR.
APPLICATION FILED MAY 14, 1912.

1,199,254.

Patented Sept. 26, 1916.
6 SHEETS—SHEET 1.

Fig.1.

Witnesses
H. H. Lybrand
S. Jay Teller

Inventor
Albert O. Espe
By H. H. Bliss
Attorney

A. O. ESPE.
TRACTOR.
APPLICATION FILED MAY 14, 1912.

1,199,254.

Patented Sept. 26, 1916.
6 SHEETS—SHEET 2.

Fig. 2.

Witnesses
H. H. Lybrand
S. Jay Feller

Inventor
Albert O. Espe,
By H. A. Bliss
Attorney

A. O. ESPE.
TRACTOR.
APPLICATION FILED MAY 14, 1912.

1,199,254.

Patented Sept. 26, 1916.
6 SHEETS—SHEET 6.

UNITED STATES PATENT OFFICE.

ALBERT O. ESPE, OF CROOKSTON, MINNESOTA, ASSIGNOR TO AVERY COMPANY, OF PEORIA, ILLINOIS, A CORPORATION OF ILLINOIS.

TRACTOR.

1,199,254.   Specification of Letters Patent.   Patented Sept. 26, 1916.

Application filed May 14, 1912. Serial No. 697,234.

*To all whom it may concern:*

Be it known that I, ALBERT O. ESPE, a citizen of the United States, residing at Crookston, in the county of Polk and State of Minnesota, have invented certain new and useful Improvements in Tractors, of which the following is a specification, reference being had therein to the accompanying drawing.

My invention relates more especially to tractors or traction engines adapted to be driven by internal combustion motors.

The object of my invention is to provide a powerful but at the same time unusually light tractor adapted for varied uses on and about a farm.

A tractor embodying my improvements is well adapted for the hauling of vehicles, for the hauling of implements such as plows or harvesters, and for the driving of various machines, such as threshers, which require power.

Among the principal novel structural features of my invention are a power plant mounted to slide bodily as a whole with respect to the main supporting frame, and a single clutch through which power can be transmitted either to drive the tractor bodily or to supply power to another machine through a belt.

Numerous other novel features and combinations of features are set forth in the following specification and claims.

Of the accompanying drawings which show the embodiment of my invention which I now deem preferable.

Referring to the drawings it will be noted that I have provided two separate and distinct frames. These frames and the parts associated with them will be hereinafter fully described but for the present it can be borne in mind that there is a main traction carriage supported upon the usual four ground wheels and a second or power plant frame which supports all of the elements of the power plant and which is slidable bodily with respect to the frame of the carriage for a purpose to be set forth.

The main frame of the traction carriage is preferably rectangular in configuration and comprises two side elements 1, 1, which may advantageously be channel bars arranged with their backs outward and end elements 2, 2, which may also be channel bars similarly arranged. The side and end portions of the frame are preferably connected by suitable corner brackets 3, 3. One of these brackets is shown in section in Fig. 9.

At the rear of the traction carriage and engaging the transverse axle 4 are two large ground engaging supporting and driving wheels 5, 5. A long tube or sleeve 6 is provided which incloses the axle throughout the greater part of its length between the two wheels 5, 5. The tube 6 is provided at suitable points with horizontal bosses or shelves 7 upon which rest the rear ends of the side members 1, 1, of the main carriage frame. Plates 8 are preferably interposed between the shelves 7 and the frame members 1.

9 is a transverse rotatable shaft positioned a short distance in advance of the axle. This shaft is mounted in a bearing tube or sleeve 10 which is similar to the tube 6 for the axle. The tube 10 is provided with bosses or shelves 11 adapted to engage the frame side members 1, 1, suitable plates 12 being preferably interposed.

The two tubes 6 and 10 are preferably tied together by means of longitudinal rods 13, 13. These rods extend through apertures in suitably formed bosses at the bottoms of the tubes and by means of nuts on the rods the two bearing tubes can be adjusted one with respect to the other and then locked in adjusted position.

Each of the tubes 6 and 10 is provided near its ends with depending bosses 14, 14. Below the main frame of the carriage there is provided a sub-frame which is formed in part of two longitudinal metallic straps 15, 15, each of which is bent upward at its forward end and is secured to the corresponding main frame side element at 16. Behind each point of attachment at 16 there is provided a vertical strut 17 between the side element 1 and the strap 15. Each strap 15 engages the bottoms of the bosses 14, 14, at the corresponding ends of the bearing tubes 6 and 10. The straps are held in engagement with the bosses and the tubes are secured to the main frame by means of bolts 18 and 19, which extend through suitable vertical apertures in the bottom flanges of the frame side elements, in the sleeves and their bosses, and in the straps. The holes in the bottom flanges of the frame elements and in the straps are large enough to permit adjustment of the sleeves within narrow limits. The two straps 15, 15, are connected at their rear ends by means of a transverse bar 20 which is preferably angle shaped.

21 is a platform for the operator mounted upon the subframe. Preferably a resilient connection is provided for this platform. As shown in the drawings the forward end of the platform is pivotally connected to the sub-frame by means of hinges at 22. The rear end of the platform is supported upon the cross bar 20 by means of interposed coil springs 23. At the side of the platform there are preferably guards or covers 23ª, 23ª, for the drive wheels 5, 5.

The draft connection for the tractor comprises a horizontal draft bar 24 which is pivotally connected at its forward end to a horizontal transverse plate 25, which is preferably provided with a number of pivot apertures so that the line of draft can be adjusted transversely. The transverse plate 25 is connected with the sub-frame by means of a suitable truss construction which is preferably made up of side straps 26 each secured at its ends to the corresponding sub-frame strap 15. The straps 26 are at their centers spaced from the straps 15 and are held separated therefrom by means of suitable struts, 27, 27.

A suitable transversely extending guide or support 28 is provided for holding the rear end of the draft bar 24. This support permits the draft bar to be swung to one side or the other.

The attachment of the draft bar at a point immediately adjacent the main rear axle prevents the load that is being hauled from opposing the steering of the machine. If the draft bar were connected in the rear of the axle the force transmitted through it would oppose the swinging movement of the tractor in response to an adjustment of the steering wheels.

At its forward end the main carriage frame is supported on the ground wheels 29, 29, and the axle 30. The axle 30 is pivotally connected with the frame by means of a suitable bolster 31. The axle and bolster are braced and held against longitudinal movement with respect to the frame by means of a diagonal bar or brace 32. At the forward end of the brace 32 there is an eye 33 which can be used when the engine is moving rearward for the attachment of a vehicle or other object to be hauled.

34 is a transverse steering shaft rotatable in suitable bearings on the main carriage frame. This shaft carries at one end a worm wheel 35 which meshes with a worm 36 on a steering rod 37 which extends diagonally upward and backward and carries at its rear upper end a steering wheel 38.

39 and 40 are two chains each connected at its forward end to the axle 30 near one end and each connected at the rear end to the transverse steering shaft 34 to be wound thereon. The chains are so connected to the shaft that as the shaft is rotated one of the chains will be wound upon it, and the other of them will be unwound from it. In this way, by turning the hand-wheel 38 and thereby rotating the shaft 34, the operator can cause the axle 30 together with the wheels 29, 29, to be swung in one direction or the other for steering.

Suitably secured to each of the drive wheels 5 is a large bull wheel 41. At each end of the transverse shaft 9 is a pinion 42 which meshes with the corresponding bull wheel 41.

43 is a large drive wheel mounted for rotation on the shaft 9. Suitable differential gearing is interposed between the gear wheel 43 and the two pinions 42, 42. The differential gearing can be arranged in any desired way but I prefer to provide a case 44 within which can be mounted differential driving pinions meshing with suitable gears secured respectively to the right hand pinion 42 and to the shaft 9. The right hand pinion 42 is rotatable with respect to the shaft 9 and the left hand pinion 42 is keyed to it. In this way power can be transmitted from the gear wheel 43 differentially to the two pinions 42, 42, and from them to the drive wheels 5, 5.

Figure 1:
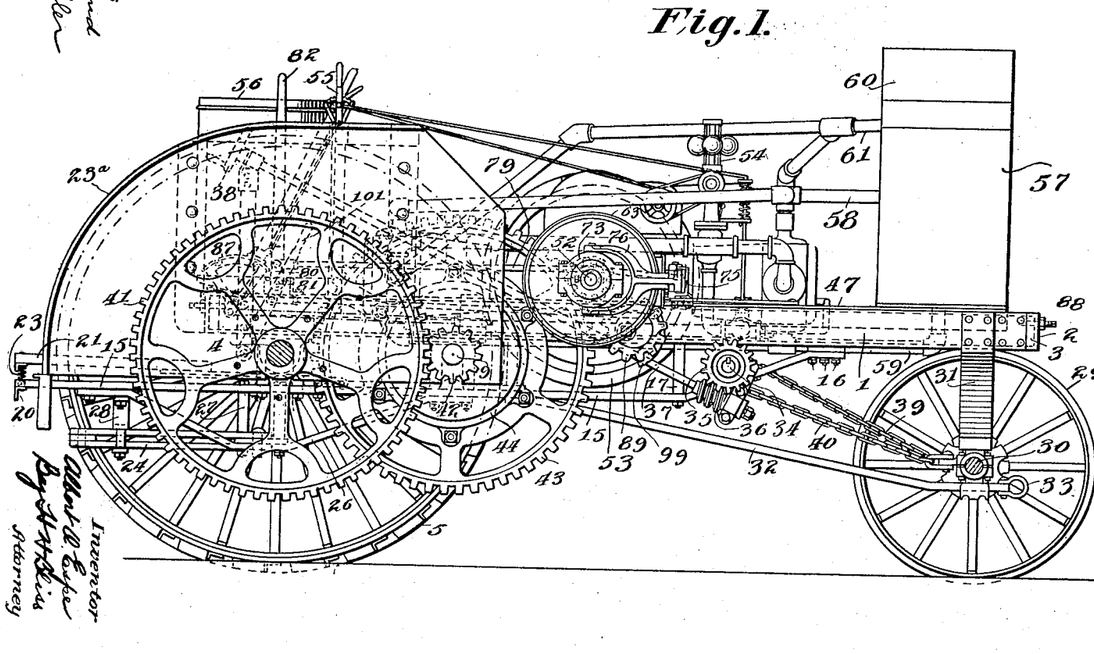
Figure 1 is a side elevation of the tractor, the near ground wheels being omitted for the sake of clearness.
Figure 2:
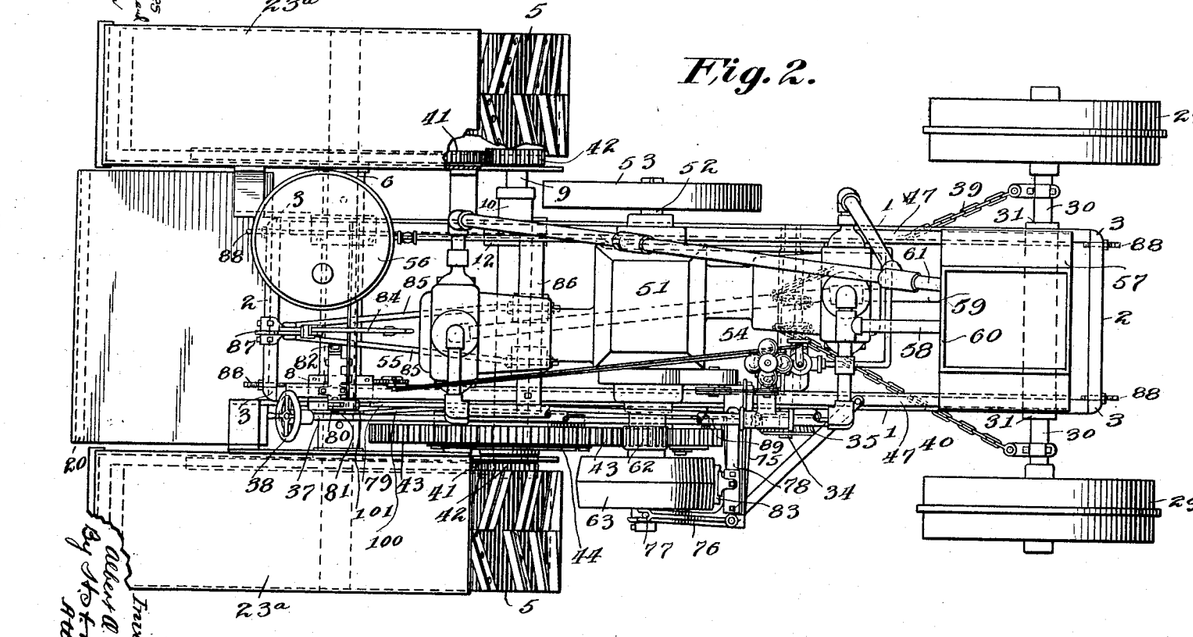
Fig. 2 is a plan view.
Figures 3, 4, 5:
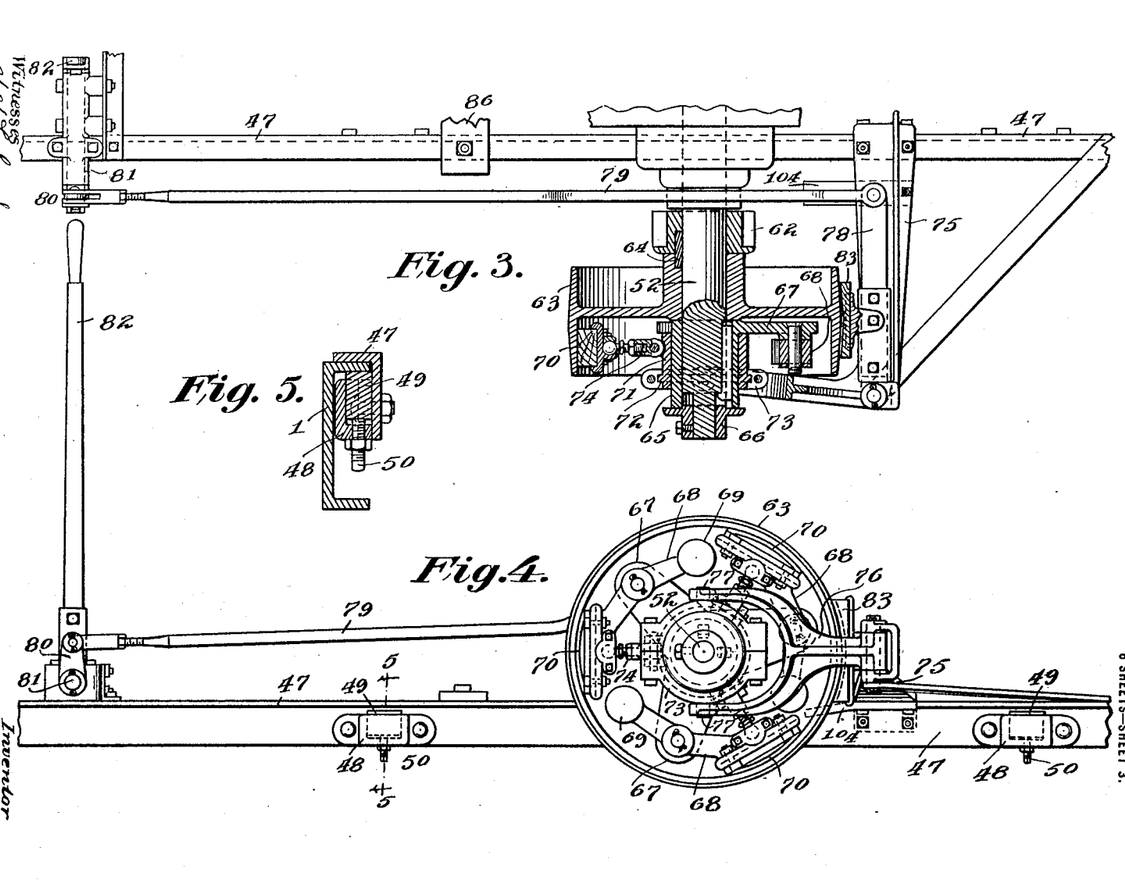
Fig. 3 is a fragmentary combined plan and sectional view of the clutch, pinion and belt wheel at one end of the engine or motor shaft together with the parts immediately associated therewith.
Fig. 4 is a side elevation of the parts shown in Fig. 3.
Fig. 5 is a detail cross sectional view through the side members of the traction carriage and the power plant frame, the section through the power plant frame being taken along the line 5—5 of Fig. 4.

The slidable power plant frame comprises two main side elements 47, 47, which are tied together by suitable cross members and by the parts such as the motor and radiator frames which are mounted upon them. Each of the side elements 47 preferably comprises an angle bar arranged with its vertical leg extending downward at the inner side. The elements 47, 47, are so spaced that the horizontal leg of each of them can engage and rest upon the top of the horizontal flange of the corresponding element 1 of the main carriage frame, as shown in Fig. 5. The engagement between these frame elements is a slidable one and the elements 47, 47, can be moved longitudinally with respect to the elements 1, 1, by devices to be described. In order that the elements 47, 47, and 1, 1, may be held in proper relationship, I prefer to provide on each shaft 47, two or more brackets or guides 48, within each of which there is mounted for suitable movement a block 49 adapted to engage at its upper end with the under side of the top flange of the corresponding element 1. A screw 50 is provided in each bracket 48 for adjusting the block 49 to hold it in proper relationship with the flange of the element 1. These blocks 49, 49, serve to prevent any vertical movement of the power plant frame away from the main carriage frame.

51 represents as a whole the internal combustion motor or engine by means of which power is supplied to drive the tractor engine or for other purposes. A motor of any suitable type may be used, but in the drawings I have shown a motor provided with two horizontal oppositely disposed cylinders. The motor is suitably supported upon the frame elements 47, 47, and is arranged with its crank shaft 52 extending transversely. At one end of the shaft 52 there is provided a fly wheel 53.

54 represents a governor for the engine which may be of any usual or preferred type. Suitable controlling means for the engine are provided within reach of the operator at 55.

56 is a fuel tank mounted upon the slidable power plant frame preferably at the rear end and is provided with suitable connections with the motor. At the forward end of the slidable power plant frame there is provided a radiator 57 through which cooling water from the cylinders of the motor can be led. This radiator can be of any usual or preferred construction and need not be here described in detail. The heated water from the engine cylinders is led to the radiator preferably through the pipe 58, and after passing through the radiator and being cooled is led through the pipe 59 back to the cylinders. I do not however claim this specific form of radiator as a part of my present invention and if desired another form may be used. At the top of the radiator there may be provided a chimney 60 into which the exhaust gases from the cylinders can be discharged through a pipe 61.

As clearly shown in Figs. 3 and 4, a pinion 62 and a belt wheel 63 are rotatably mounted on the end of the motor shaft 52 opposite to that upon which is located the fly wheel 53. The pinion and the belt wheel are connected with each other but not with the shaft by means of a key 64. The position of the pinion 62 on the shaft is such that it can mesh with the drive gear 43 when the power plant is in proper position.

A clutch is provided for connecting the belt wheel 63 and the pinion 62 with the motor shaft 52. This clutch may be of any one of a number of types but in the drawings I have shown a clutch which I consider especially well adapted for this purpose.

65 is a sleeve keyed to the outer end of the shaft 52 and held in place by a collar 66. This sleeve 65 is provided with a number (preferably three) of arms which are positioned at points within the rim of the wheel 63. Pivotally connected to each of the arms 67 is a lever 68 which carries at one end a weight 69 and at its other end a shoe 70 adapted to frictionally engage the inner surface of the rim of the wheel 63. The shoe 70 may be constructed of wood or other suitable material. Slidably mounted upon the sleeve 65 is a second sleeve 71 which is provided near its outer end with an annular flange or rib 72.

73 is a collar formed in two parts and adapted to fit over and engage the flange 72 on the sleeve 71. Between the shoe end of each of the levers 67 and the sleeve 71 there is provided a strut or thrust connection 74. Each strut preferably has a ball and socket connection with its lever 68 and a pivotal connection with the sleeve 71. Each strut is preferably made up of two parts which are threaded together and so arranged that by turning one of them with respect to the other the length of the strut can be adjusted. The arrangement is such that when the sleeve 71 is in its innermost position, as shown in Fig. 3, the shoes 70 will be held in firm engagement with the inner surface of the wheel. When the sleeve is in its outer position the levers 68 will be swung and the shoes 70 withdrawn from engagement with the wheel. The lengths of the struts 74 can be adjusted from time to time in the manner described to compensate for wear on the shoes 70.

75 is a horizontal bracket adjacent the clutch and secured at its inner end to the right hand power plant frame element 47.

Mounted for movement about a vertical pivot at the outer end of the bracket 75 is a bell crank having one arm 76 forked and provided with apertures to receive oppositely disposed trunnions 77 on the collar 73. The other arm 78 of the bell crank extends inward and has pivotally connected to its inner end a link 79 which extends rearward and is pivotally connected to an arm 80 on a transverse rock shaft 81.

82 is an operating lever secured to the rock shaft 81 and positioned within reach of the operator. With the parts in the position shown in Figs. 3 and 4, the clutch is operative and the belt wheel 63 and the pinion 62 are connected with the engine shaft 52. Inasmuch as each strut 74 is parallel to the line of force reaction between the corresponding shoe and the rim of the wheel there is no tendency for the clutch to be thrown out of operation. The clutch can however be very easily thrown out of operation by a slight movement of the lever 82. By moving this lever the sleeve 71 can be moved longitudinally and a corresponding inward movement of the shoes will take place. The counter weights 69 on the levers 68 serve to offset the tendency of the shoes to move outward under the influence of centrifugal force.

Mounted upon the arm 78 of the bell crank is a brake shoe 83 which is formed to engage the outer surface of the belt wheel 63. This brake shoe is so arranged that it will be automatically brought into engagement with the wheel whenever the parts are moved to disengage the clutch. This brake shoe serves to very quickly stop the rotation of the belt wheel and of the pinion 62.

Figure 6:
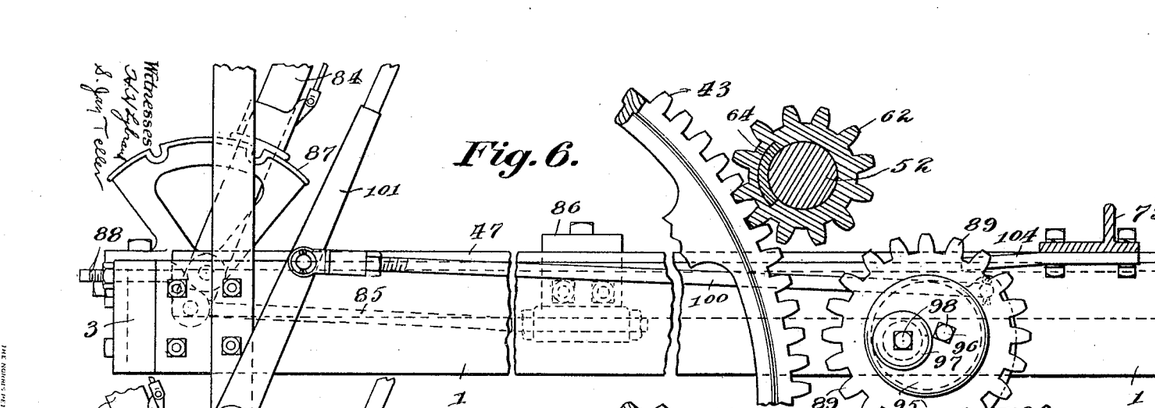
Fig. 6 is a fragmentary side view, partly diagrammatic, showing the motor pinion in the position which it assumes when the power plant is in its rear position.
Figure 7:
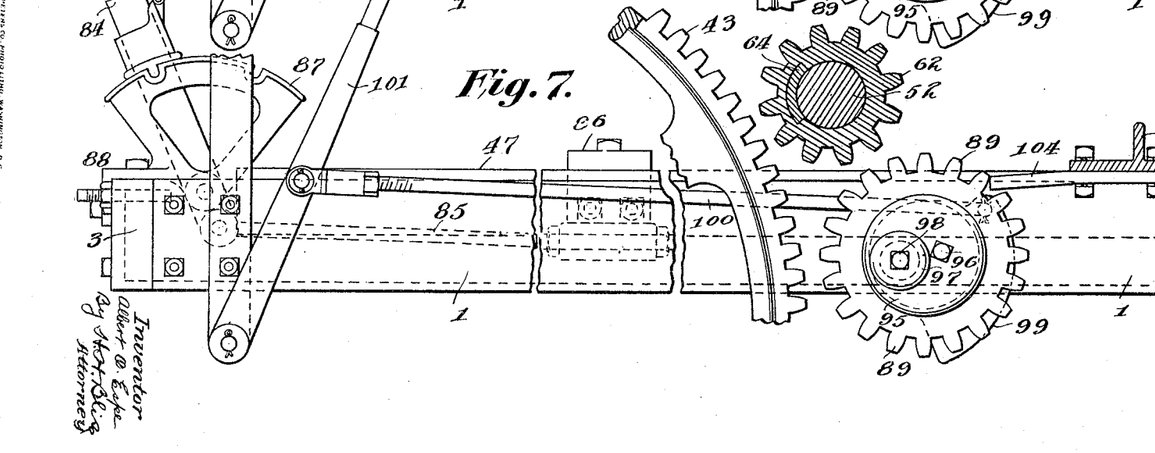
Fig. 7 is a view similar to Fig. 6, showing the motor pinion in the position which it assumes when the power plant is in its forward position.
Figures 8, 9:
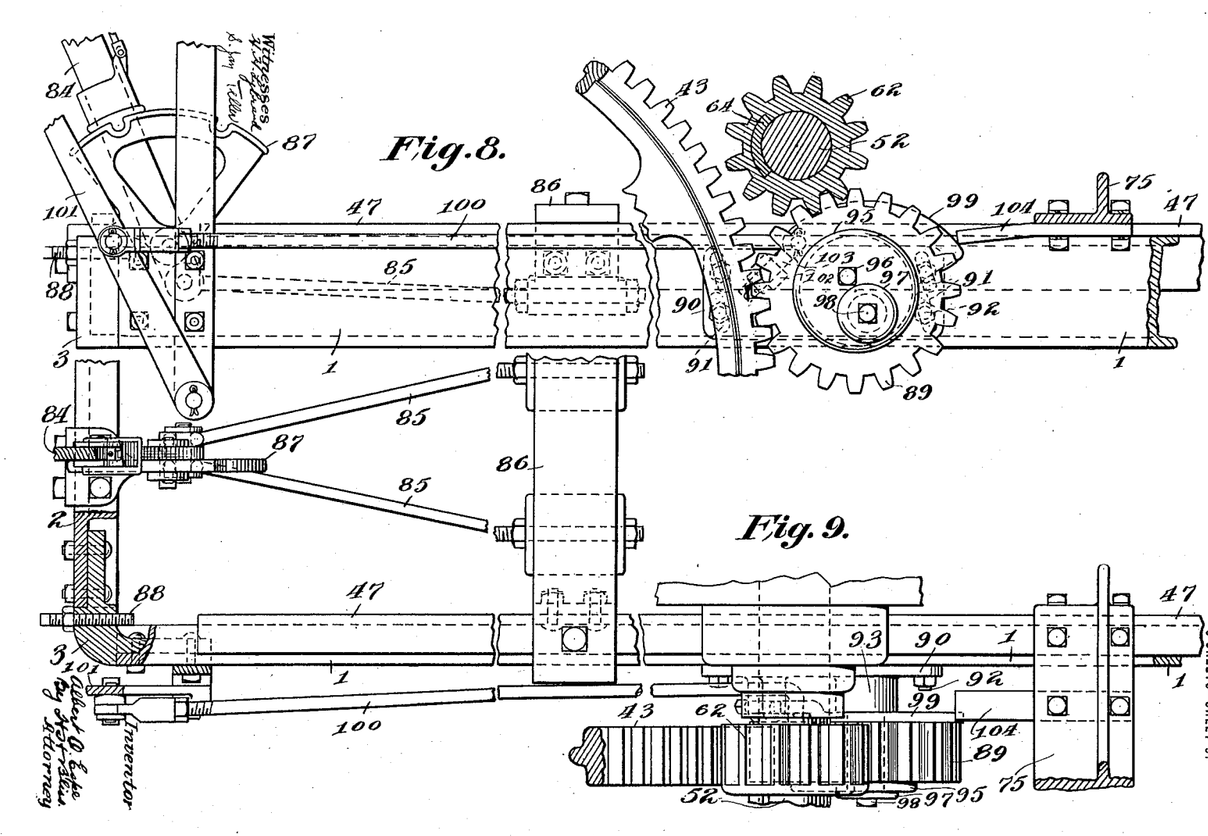
Fig. 8 is a view similar to Fig. 7, showing the intermediate reversing pinion adjusted to connect the motor pinion with the driving gear.
Fig. 9 is a plan view of the parts shown in Fig. 8.

As has been before stated the whole power plant together with its supporting frame can be bodily moved longitudinally of the main carriage frame. The means which I have provided for effecting this longitudinal movement of the power plant comprises a hand lever 84 which is pivotally mounted near its lower end on the rear cross piece 2 of the main carriage frame. This lever is within easy reach of the operator. Pivotally connected with the lever 84 at its end below the point of pivotal mounting on the frame, are two connecting rods 85, 85, which are separated at their forward ends and suitably connected to a cross member 86 which extends between the two side elements 47, 47, of the power plant frame. Adjacent the lever 84 is a segment 87 provided with two notches either of which can be engaged by a manually controlled latch on the lever to lock the lever in place with the power plant frame either in its forward or in its rear position. The arrangement is such that when the power plant is in its rear position the pinion 62 on the motor shaft will mesh with the main drive wheel 43 as indicated in Fig. 6. When the power plant is in its forward position the pinion will be out of mesh with the gear as indicated in Figs. 7 and 8. In order that the longitudinal movement of the power plant frame may be accurately limited, I provide on the main frame screws 88, 88, which are so positioned that each will engage one end or the other of one of the power plant frame side members 47. These screws 88 are adjustable and by means of them the extent of movement of the power plant frame can be accurately controlled. For instance it is possible to so adjust the screws that when the frame is moved rearward it will be stopped with the pinion 62 accurately in mesh with the drive gear 43.

Figure 10:
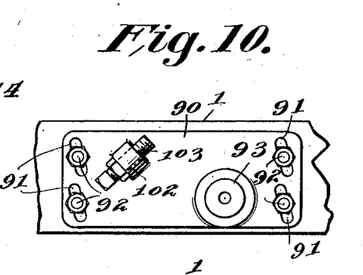
Fig. 10 is an elevation of the bracket upon which the reversing pinion is mounted.
Figure 11:
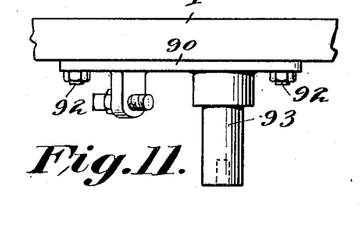
Fig. 11 is a plan view of the bracket shown in Fig. 10.
Figure 12:
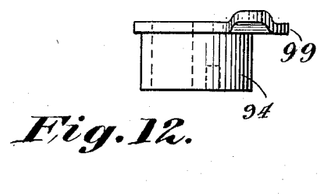
Fig. 12 is a plan view of the movable eccentric bearing for the reversing pinion.
Figure 13:
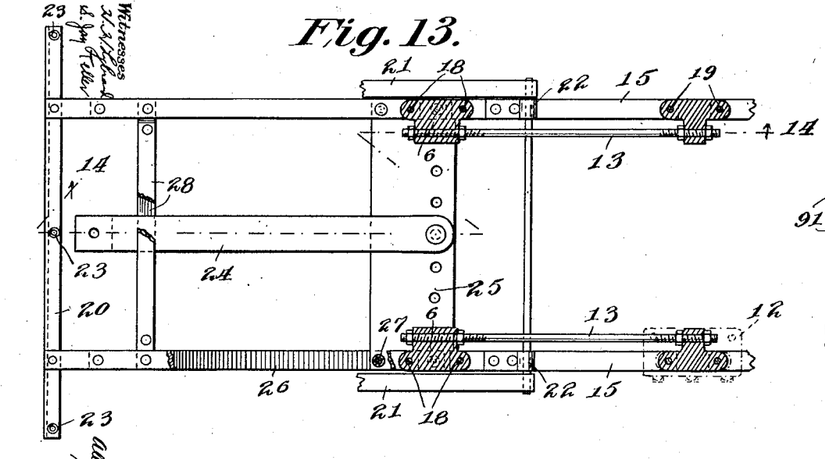
Fig. 13 is a fragmentary, plan and sectional view taken along the line 13—13 of Fig. 14.
Figure 14:
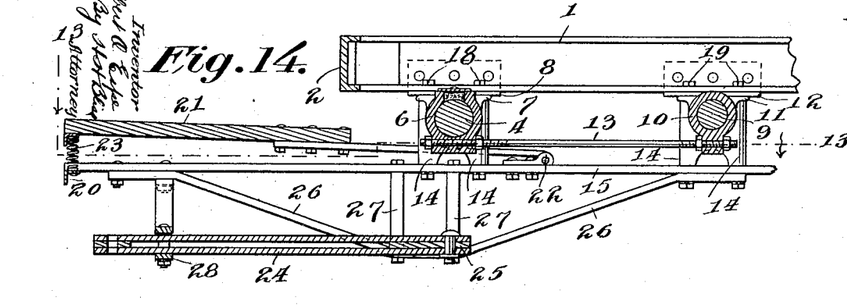
Fig. 14 is a longitudinal sectional view taken along the line 14—14 of Fig. 13.

89 is a reversing pinion which can be moved to mesh with the drive wheel 43 and the pinion 62 to transmit power from the pinion to the gear in the reverse direction when the pinion and gear are separated as indicated in Fig. 8. Preferably the pinion 89 is mounted upon a bracket 90 secured to the side element 1 of the main carriage frame. Preferably as indicated in Figs. 8 and 10 the plate 90 has slots 91 for receiving studs 92 on the frame element. As indicated in Fig. 8, the slots are substantially parallel with the pitch circle of the gear 43 at the point of engagement with the gear 89. It is therefore possible to adjust the gear 89 bodily along lines parallel to the periphery of the drive gear 43. The bracket and the gear can be locked in adjusted position by means of nuts on the studs 92. The bracket 90 is provided with a stub shaft 93 upon which there is rotatably mounted an eccentric 94 which is shown in detail in Fig. 12. The gear 89 has a bearing on the periphery of the eccentric 94 and the gear is held in place by means of a cap 95 secured by a bolt 96. The eccentric, the gear and the cap 95 are all held in place on the shaft 93 by means of a second cap 97, secured by a bolt 98. The eccentric 94 is provided at one side with a segment 99 which is concentric with the aperture for the shaft 93. Pivotally connected to one end of this segment 99 is a rod 100 which extends rearward and is connected to a hand lever 101 which is pivotally connected at its lower end with the main carriage frame. This lever 101 is within convenient reach of the operator. When the parts are in the position shown in Fig. 7, the operator by moving the lever 101, can move the eccentric 94 and with it the gear 89 about the shaft 93. This movement brings the gear 89 simultaneously into mesh with the gear 43 and the pinion 62 as shown in Fig. 8. Power can then be transmitted from the pinion through the gear 89 to drive the gear 43 in the direction opposite to that in which it is driven when directly engaged by the pinion. In order to limit the movement of the eccentric and the gear about the shaft 93 I provide a lug 102 on the bracket 90 and in a threaded aperture in this lug there is a screw 103 adapted to engage the end of the segment 99. By adjusting the screw the extent of movement of the eccentric can be controlled as desired.

In order that the gear 89 may not be moved into engaging position when the pinion 62 is not out of mesh with the gear 43 and in order to prevent rearward movement of the power plant when the gear 89 is in operative position, I provide a stop 104 which may conveniently be mounted upon the bracket 75 before referred to. This stop is so positioned that it will engage the segment 99 when the eccentric is not in the extreme position shown in Figs. 6 and 7 and positively lock the power plant frame against rearward movement. The stop 104 also serves to prevent movement of the eccentric when the power plant frame is in its rear position as shown in Fig. 6. It will be seen that this stop serves to positively prevent the gears being all engaged at the same time and thereby injured.

In operation the motor 51 can be first started by manually turning the fly wheel 53, it being of course understood that the clutch is disengaged. It being assumed that the power plant is in its rear position as indicated in Fig. 6, the tractor can be started in the forward direction by simply moving the lever 82 to engage the clutch. When it is desired to reverse the tractor and run it in the other direction, the operator first moves the lever 82 to disengage the clutch and simultaneously apply the brake 83 to stop rotation of the pinion 62. Then by means of the lever 84 he moves the power plant forward to bring the pinion 62 into the position indicated in Fig. 7. Then by means of the lever 101 the gear 89 is moved into mesh with the pinion 62 and the gear 43. The clutch can then be thrown into engagement and the tractor started in the rearward direction.

When the tractor is to be used for driving a thresher or other machine it can be driven by its own power into proper position to bring the belt wheel 63 into alinement with the belt wheel of the machine to be driven. It will of course be understood that the belt will extend forward and will not therefore be interfered with by the brake 83. Preferably the tractor is placed initially near enough to the machine to permit the belt to be easily put on the pulleys. Then with the reversing gear 89 in the operative position, as shown in Fig. 8, the operator can, by carefully throwing the clutch, move the tractor slowly backward far enough to properly tension the belt. After the belt is properly tensioned the clutch can be thrown out and the reversing gear can be moved to the position shown in Fig. 7. Then the clutch can be thrown in and the tractor is ready to supply power to the thresher or other machine which is to be driven.

It will be noted that I have provided a tractor which has a single clutch through which power can be transmitted either to drive the tractor bodily over the ground or to transmit power through a belt to an independent mechanism. One of the features which make possible the control of the tractor by means of a single clutch is the rigid connection between the belt wheel and the driving pinion for free rotation on the engine shaft. Another very advantageous feature is the provision in combination with the single clutch for the belt wheel and pinion of the slidable power plant for making and breaking the power connection to the ground wheels. In my co-pending application for gas tractors, Serial Number 606,719, filed February 6, 1911, I have shown a motor slidably mounted upon the main frame of a tractor and I do not therefore claim this subject-matter broadly as a part of my present invention. I do however believe that by my present invention I am the first to provide an entire power plant including the fuel supply tank, the radiator and all auxiliary mechanisms mounted for slidable movement as a unit. In fact, if desired, the entire power plant can be detached from the carriage frame without the disturbance of any of its parts.

What I claim is:—

1. The combination with the main frame, the driving wheels, the steering wheels, and the toothed gearing mounted on the main frame and permanently connected to the drive wheels, of the supplemental frame slidably mounted on the main frame, a toothed prime power pinion mounted on, and bodily movable with, the sliding frame and adapted to mesh with said toothed gearing, a complete power plant on the slidable frame comprising an internal combustion engine, an engine shaft, a liquid fuel tank, a cooling water-jacket system for the engine, a water-cooling radiator, ducts connecting the radiator and the engine water-jacket system and having all of their parts permanently fixed in rigid relation to the engine and the radiator, said engine shaft being normally loose in relation to said prime pinion, manual means for connecting the shaft to said pinion, and manual means for moving the said power plant as an entirety with the radiator, and radiator ducts, while held in said fixed relationship, to bring said pinion into and out of operative relation with said toothed gearing on the main frame.

2. In a tractor, the combination with a main frame and driving and steering wheels therefor, of an engine mounted on the frame, a drive pinion and a belt pulley rigidly connected together for rotation independently of the shaft of the engine, a single manually controllable clutch for connecting the pinion and the pulley simultaneously to the shaft of the engine, gearing for transmitting power from the said drive pinion to the main drive wheels of the tractor and means for breaking the power connection between the pinion and the drive wheels.

3. In a tractor, the combination with a main frame and driving wheels and steering wheels therefor, of an internal combustion engine mounted on the frame, a drive pinion and a belt pulley rigidly connected together for rotation independently of the shaft of the engine, means independent of the pinion and pulley whereby the engine may be turned for starting, a single manually controllable clutch for connecting the pinion and the pulley simultaneously to the shaft of the engine, gearing for transmitting power from the said drive pinion to the main drive wheels of the tractor and means for breaking the power connection between the pinion and the drive wheels.

4. In a tractor, the combination with a main frame and driving and steering wheels therefor, of an engine mounted on the frame, a drive pinion and a belt pulley connected for rotation independently of the shaft of the engine, a single manually controllable clutch for connecting the pinion and the pulley simultaneously to the shaft of the engine, a brake for the pulley and pinion, gearing for transmitting power from the said drive pinion to the main drive wheels of the tractor, and means for breaking the power connection between the pinion and the drive wheels.

5. In a tractor, the combination with a main frame and driving and steering wheels therefor, of an engine mounted on the frame, a drive pinion and a belt pulley connected for rotation independently of the shaft of the engine, a single manually controllable clutch for connecting the pinion and the pulley simultaneously to the shaft of the engine, a brake for the pulley and pinion connected with the clutch to be automatically applied when the clutch is released, gearing for transmitting power from the said drive pinion to the main drive wheels of the tractor, and means for breaking the power connection between the pinion and the drive wheels.

6. In a tractor, the combination with a main frame and driving and steering wheels therefor, of an internal combustion engine mounted on the frame, a drive pinion and a belt pulley connected for rotation independently of the shaft of the engine, means independent of the pinion and pulley whereby the engine may be turned for starting, a single manually controllable clutch for connecting the pinion and the pulley simultaneously to the shaft of the engine, a brake for the pulley and pinion, gearing for transmitting power from the said drive pinion to the main drive wheels of the tractor, and means for breaking the power connection between the pinion and the drive wheels.

7. In a tractor, the combination with a main frame and driving and steering wheels therefor, of an engine mounted on the frame, a drive pinion and a belt pulley rigidly connected together for rotation independently of the shaft of the engine, a single manually controllable clutch for connecting the pinion and the pulley simultaneously to the shaft of the engine, gearing for transmitting power from the said drive pinion to the main drive wheels of the tractor, means for breaking the power connection between the pinion and the drive wheels, and means for changing the power connection between the pinion and the drive wheels to cause the drive wheels to be driven in the reverse direction.

8. In a tractor, the combination with a main frame and driving and steering wheels therefor, of an internal combustion engine mounted on the frame, a drive pinion and a belt pulley rigidly connected together for rotation independently of the shaft of the engine, means independent of the pinion and pulley whereby the engine may be turned for starting, a single manually controllable clutch for connecting the pinion and the pulley simultaneously to the shaft of the engine, gearing for transmitting power from the said drive pinion to the main drive wheels of the tractor, means for breaking the power connection between the pinion and the drive wheels, and means for changing the power connection between the pinion and the drive wheels to cause the drive wheels to be driven in the reverse direction.

9. In a tractor, the combination with a main frame and driving and steering wheels therefor, of an engine mounted on the frame, a drive pinion and a belt pulley connected for rotation independently of the shaft of the engine, a single manually controllable clutch for connecting the pinion and the pulley simultaneously to the shaft of the engine, a brake for the pulley and pinion connected with the clutch to be automatically applied when the clutch is released, gearing for transmitting power from the said drive pinion to the main drive wheels of the tractor, means for breaking the power connection between the pinion and the drive wheels, and means for changing the power connection between the pinion and the drive wheels to cause the drive wheels to be driven in the reverse direction.

10. In a tractor, the combination with a main frame and driving and steering wheels therefor, of an internal combustion engine mounted on the frame, a drive pinion and a belt pulley connected for rotation independently of the shaft of the engine, means independent of the pinion and pulley whereby the engine may be turned for starting, a single manually controllable clutch for connecting the pinion and the pulley simultaneously to the shaft of the engine, a brake for the pulley and pinion connected with the clutch to be automatically applied when the clutch is released, gearing for transmitting power from the said drive pinion to the main drive wheels of the tractor, means for breaking the power connection between the pinion and the drive wheels, and means for changing the power connection between the pinion and the drive wheels to cause the drive wheels to be driven in the reverse direction.

11. In a tractor, the combination with a main frame and driving and steering wheels therefor, of an engine mounted on the frame, a drive pinion and a belt pulley connected for rotation independently of the shaft of the engine, a single manually controllable clutch for connecting the pinion and the pulley simultaneously to the shaft of the engine, means for moving the engine and the pinion relatively to the main frame, and a gear on the main frame connected with the drive wheels and positioned to be engaged by the said drive pinion when the pinion is in one position and to be disengaged from the pinion when the pinion is in another position.

12. In a tractor, the combination with a main frame and driving and steering wheels therefor, of an internal combustion engine mounted on the frame, a drive pinion and a belt pulley connected for rotation independently of the shaft of the engine, means independent of the pinion and pulley whereby the engine may be turned for starting, a single manually controllable clutch for connecting the pinion and the pulley simultaneously to the shaft of the engine, means for moving the engine and the pinion relatively to the main frame, and a gear on the main frame connected with the drive wheels and positioned to be engaged by the said drive pinion when the pinion is in one position and to be disengaged from the pinion when the pinion is in another position.

13. In a tractor, the combination with a main frame and driving and steering wheels therefor, of an engine mounted on the frame, a drive pinion and a belt pulley connected for rotation independently of the shaft of the engine, a single manually controllable clutch for connecting the pinion and the pulley simultaneously to the shaft of the engine, a brake for the pulley and pinion connected with the clutch to be automatically applied when the clutch is released, means for moving the engine and the pinion relatively to the main frame, and a gear on the main frame connected with the drive wheels and positioned to be engaged by the said drive pinion when the pinion is in one position and to be disengaged from the pinion when the pinion is in another position.

14. In a tractor, the combination with a main frame and driving and steering wheels therefor, of an internal combustion engine mounted on the frame, a drive pinion and a belt pulley connected for rotation independently of the shaft of the engine, means independent of the pinion and pulley whereby the engine may be turned for starting, a single manually controllable clutch for connecting the pinion and the pulley simultaneously to the shaft of the engine, a brake for the pulley and pinion connected with the clutch to be automatically applied when the clutch is released, means for moving the engine and the pinion relatively to the main frame, and a gear on the main frame connected with the drive wheels and positioned to be engaged by the said drive pinion when the pinion is in one position and to be disengaged from the pinion when the pinion is in another position.

15. In a tractor, the combination with a main frame and driving and steering wheels therefor, of an engine mounted on the frame, a drive pinion and a belt pulley connected for rotation independently of the shaft of the engine, a single manually controllable clutch for connecting the pinion and the pulley simultaneously to the shaft of the engine, means for moving the engine and the pinion relatively to the main frame, a gear on the main frame connected with the drive wheels and positioned to be engaged by the said drive pinion when the pinion is in one position and to be disengaged from the pinion when the pinion is in another position, an idler pinion movably mounted on the main frame, and means for moving the said idler pinion to bring it into engagement with the said drive pinion and the said gear when the drive pinion is out of direct engagement with the gear.

16. In a tractor, the combination with a main frame and driving and steering wheels therefor, of an internal combustion engine mounted on the frame, a drive pinion and a belt pulley connected for rotation independently of the shaft of the engine, means independent of the pinion and pulley whereby the engine may be turned for starting, a single manually controllable clutch for connecting the pinion and the pulley simultaneously to the shaft of the engine, means for moving the engine and the pinion relatively to the main frame, a gear on the main frame connected with the drive wheels and positioned to be engaged by the said drive pinion when the pinion is in one position and to be disengaged from the pinion when the pinion is in another position, an idler pinion movably mounted on the main frame, and means for moving the said idler pinion to bring it into engagement with the said drive pinion and the said gear when the drive pinion is out of direct engagement with the gear.

17. In a tractor, the combination with a main frame and driving and steering wheels therefor, of an engine mounted on the frame, a drive pinion and a belt pulley connected for rotation independently of the shaft of the engine, a single manually controllable clutch for connecting the pinion and the pulley simultaneously to the shaft of the engine, a brake for the pulley and pinion connected with the clutch to be automatically applied when the clutch is released, means for moving the engine and the pinion relatively to the main frame, a gear on the main frame connected with the drive wheels and positioned to be engaged by the said drive pinion when the pinion is in one position and to be disengaged from the pinion when the pinion is in another position, an idler pinion movably mounted on the main frame, and means for moving the said idler pinion to bring it into engagement with the said drive pinion and the said gear when the drive pinion is out of direct engagement with the gear.

18. In a tractor, the combination with a main frame and driving and steering wheels therefor, of an internal combustion engine mounted on the frame, a drive pinion and a belt pulley connected for rotation independently of the shaft of the engine, means independent of the pinion and pulley whereby the engine may be turned for starting, a single manually controllable clutch for connecting the pinion and the pulley simultaneously to the shaft of the engine, a brake for the pulley and pinion connected with the clutch to be automatically applied when the clutch is released, means for moving the engine and the pinion relatively to the main frame, a gear on the main frame connected with the drive wheels and positioned to be engaged by the said drive pinion when the pinion is in one position and to be disengaged from the pinion when the pinion is in another position, an idler pinion movably mounted on the main frame, and means for moving the said idler pinion to bring it into engagement with the said drive pinion and the said gear when the drive pinion is out of direct engagement with the gear.

19. In a tractor, the combination with a main frame and driving and steering wheels therefor, of an engine mounted on the frame, means for moving the engine with respect to the main frame, a drive pinion connected with the engine and bodily movable therewith, a gear on the main frame connected with the drive wheels and positioned to be engaged by the said drive pinion when it is in one position and to be disengaged by the said drive pinion when it is in another position, a rotatable idler pinion movably mounted on the main frame, and means independent of the means for moving the engine for moving the idler pinion to bring it into engagement with the drive pinion and the gear when the drive pinion is out of direct engagement with the gear.

20. In a tractor, the combination with a main frame and driving and steering wheels therefor, of an engine mounted on the frame, a drive pinion and a belt pulley connected for rotation independently of the shaft of the engine, a single manually controllable clutch for connecting the pinion and the pulley simultaneously to the shaft of the engine, means for moving the engine and the pinion relatively to the main frame, a gear on the main frame connected with the drive wheels and positioned to be engaged by the said drive pinion when it is in one position and to be disengaged from the pinion when it is in the other position, a rotatable idler pinion movably mounted on the main frame, and means independent of the means for moving the engine for moving the idler pinion to bring it into engagement with the drive pinion and the gear when the drive pinion is out of direct engagement with the gear.

21. In a tractor, the combination with a main frame and driving and steering wheels therefor, of an engine mounted on the frame, a drive pinion mounted for rotation independently of the shaft of the engine, a manually controllable clutch for connecting the pinion to the shaft of the engine, means for moving the engine and the pinion relatively to the main frame, a gear on the main frame connected with the drive wheels and positioned to be engaged by the said drive pinion when it is in one position and to be disengaged from the pinion when it is in another position, an idler pinion, a bearing for the pinion having an eccentric pivotal connection with the main frame, and means for rocking the bearing about its pivot to bring the idler pinion into engagement with the drive pinion and the gear when the pinion is out of direct engagement with the gear.

22. In a tractor, the combination with a main frame and driving and steering wheels therefor, of an engine mounted on the frame, a drive pinion mounted for rotation independently of the shaft of the engine, a manually controllable clutch for connecting the pinion to the shaft of the engine, means for moving the engine and the pinion relatively to the main frame, a gear on the main frame connected with the drive wheels and positioned to be engaged by the said drive pinion when it is in one position and to be disengaged from the pinion when it is in another position, an idler pinion, a bearing for the pinion having an eccentric pivotal connection with the main frame, means for rocking the bearing about its pivot to bring the idler pinion into engagement with the drive pinion and the gear when the pinion is out of direct engagement with the gear, and adjustable means for limiting the rocking movement of the bearing to prevent the movement of the idler pinion beyond proper meshing position.

23. In a tractor, the combination with a main frame and driving and steering wheels therefor, of an engine mounted on the frame, a drive pinion mounted for rotation independently of the shaft of the engine, a manually controllable clutch for connecting the pinion to the shaft of the engine, means for moving the engine and the pinion relatively to the main frame, a gear on the main frame connected with the drive wheels and positioned to be engaged by the said drive pinion when it is in one position and to be disengaged from the pinion when it is in another position, an idler pinion movably mounted on the main frame, means for moving the said idler pinion to bring it into engagement with the said drive pinion and the said gear when the pinion is out of direct engagement with the gear, and means for positively locking the engine and pinion against movement relatively to the main frame when the idler pinion is in mesh with the drive pinion and the gear.

24. In a tractor, the combination with a main frame and driving and steering wheels therefor, of an engine mounted on the frame, a drive pinion mounted for rotation independently of the shaft of the engine, a manually controllable clutch for connecting the pinion to the shaft of the engine, means for moving the engine and the pinion relatively to the main frame, a gear on the main frame connected with the drive wheels and positioned to be engaged by the said drive pinion when it is in one position and to be disengaged from the pinion when it is in another position, an idler pinion movably mounted on the main frame, means for moving the said idler pinion to bring it into engagement with the said drive pinion and the said gear when the pinion is out of direct engagement with the gear, and means for positively locking the idler pinion against movement into operative position when the drive pinion is in direct engagement with the gear.

25. In a tractor, the combination with a main frame, and driving and steering wheels therefor, of an engine mounted on the frame, a drive pinion mounted for rotation independently of the shaft of the engine, a manually controllable clutch for connecting the pinion to the shaft of the engine and the pinion, means for moving the engine with respect to the main frame, a gear on the main frame connected with the drive wheels and positioned to be engaged by the said drive pinion when it is in one position and to be disengaged from the pinion when it is in another position, an idler pinion movably mounted on the main frame, means for moving the said idler pinion to bring it into engagement with the said drive pinion and the said gear when the pinion is out of direct engagement with the gear, means for positively locking the engine and pinion against movement when the idler pinion is in engagement with the drive pinion and the gear, and means for positively locking the idler pinion against movement into operative position when the drive pinion is in engagement with the gear.

26. In a tractor, the combination with a main frame and driving and steering wheels therefor, of an engine mounted on the frame, a drive pinion mounted for rotation independently of the shaft of the engine, a manually controllable clutch for connecting the pinion to the shaft of the engine, means for moving the engine and the pinion relatively to the main-frame, a gear on the main frame connected with the drive wheels and positioned to be engaged by the said drive pinion when it is in one position and to be disengaged from the pinion when it is in another position, an idler pinion, a bearing for the pinion having an eccentric pivotal connection with the main frame, means for rocking the bearing about its pivot to bring the idler pinion into engagement with the drive pinion and the gear when the pinion is out of direct engagement with the gear, a projection on the bearing for locking the frame against movement when the bearing is in position to hold the idler pinion in engagement with the drive pinion and the gear, and means on the frame arranged to engage the said projection on the bearing to hold the bearing against movement when the frame is positioned to hold the drive pinion in engagement with the gear.

27. In a tractor, the combination with a main frame and driving and steering wheels therefor, of a power plant frame mounted on the main frame and slidable longitudinally with respect thereto, manually controllable means for sliding the power plant frame, an engine mounted on the slidable power plant frame for movement therewith, a drive pinion mounted on the power plant frame for movement therewith, the said pinion being rotatable independently of the engine shaft, a manually controllable clutch for operatively connecting the drive pinion with the engine shaft, a gear on the main frame connected with the drive wheels and adapted to be engaged by the said drive pinion when the power plant frame is in one position and to be disengaged by the said pinion when the power plant frame is in another position, and adjustable means for limiting the sliding movement of the power plant frame to maintain the frame when at one extreme of movement with the pinion in position for proper meshing with the said gear.

28. In a tractor, the combination with driving and steering wheels and a main frame mounted thereon and comprising at its side two channel bars, of a power plant frame comprising two side bars each having a horizontal flange resting upon the horizontal flange of the corresponding side bar of the main frame and a vertical leg positioned oppositely to the vertical element of the corresponding bar of the main frame, adjustable means on each side bar of the power plant frame for engaging the under side of the horizontal flange of the corresponding bar of the main frame to hold the power plant frame against movement upward away from the main frame, means for moving the power plant frame longitudinally with respect to the main frame, an engine mounted on the power plant frame, a drive pinion connected with the motor, and a gear on the main frame connected with the drive wheels and arranged to be engaged by the drive pinion when the power plant frame is in one position and to be disengaged by the pinion when the power plant frame is in another position.

In testimony whereof I affix my signature, in presence of two witnesses.

ALBERT O. ESPE.

Witnesses:
J. E. PAGE,
M. E. WALKER.

Copies of this patent may be obtained for five cents each, by addressing the "Commissioner of Patents, Washington, D. C."